(12) United States Patent
Iwamoto

(10) Patent No.: US 8,248,561 B2
(45) Date of Patent: Aug. 21, 2012

(54) LIQUID CRYSTAL DISPLAY HAVING PARTICULAR VIEWING ANGLE COMPENSATORS

(75) Inventor: Yoshihisa Iwamoto, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 607 days.

(21) Appl. No.: 12/542,092

(22) Filed: Aug. 17, 2009

(65) Prior Publication Data
US 2010/0053522 A1   Mar. 4, 2010

(30) Foreign Application Priority Data
Sep. 1, 2008  (JP) ................. 2008-223324

(51) Int. Cl.
*G02F 1/1335* (2006.01)
*G02F 1/1337* (2006.01)

(52) U.S. Cl. ......... 349/119; 349/117; 349/120; 349/130

(58) Field of Classification Search .................. 349/119, 349/117, 120, 130
See application file for complete search history.

(56) References Cited

U.S. PATENT DOCUMENTS

| | | |
|---|---|---|
| 4,889,412 A | 12/1989 | Clerc et al. |
| 6,642,981 B1 * | 11/2003 | Ohmuro et al. ............ 349/120 |
| 8,169,574 B2 * | 5/2012 | Iwamoto .................. 349/119 |
| 2009/0213313 A1 * | 8/2009 | Iwamoto .................. 349/118 |
| 2010/0026946 A1 * | 2/2010 | Iwamoto .................. 349/119 |

FOREIGN PATENT DOCUMENTS

| | | |
|---|---|---|
| JP | 7-69536 B2 | 7/1995 |
| JP | 3330574 B2 | 7/2002 |

* cited by examiner

*Primary Examiner* — Mike Qi
(74) *Attorney, Agent, or Firm* — Holtz, Holtz, Goodman & Chick, PC

(57) ABSTRACT

A liquid crystal display includes: a liquid crystal layer squeezed between first and second substrates and vertically aligned at a retardation of 300-1000 nm; first and second compensators disposed on the first substrate and having negative biaxial optical anisotropy; a first polarizer disposed on the first and second compensators; and a second polarizer on the second substrate disposed crossed-Nichol with said first polarizer, wherein: the second compensator is disposed between the first substrate and first compensator; an in-plane slow axis of the first compensator is disposed perpendicular to an absorption axis of the first polarizer; the in-plane slow axis of the first compensator is disposed perpendicular to an in-plane slow axis of the second compensator; and a retardation in an in-plane direction of the first compensator is larger than that of the second compensator.

15 Claims, 8 Drawing Sheets

LIQUID CRYSTAL DISPLAY HAVING PARTICULAR VIEWING ANGLE COMPENSATORS

CROSS REFERENCE TO RELATED APPLICATION

This application is based on and claims priority of Japanese Patent Application JP2008-223324 filed on Sep. 1, 2008, the entire contents of which are incorporated herein by reference.

BACKGROUND OF THE INVENTION

A) Field of the Invention

The present invention relates to a liquid crystal display (LCD)

B) Description of the Related Art

Many of liquid crystal display apparatus capable of segment display or both segment display and dot-matrix display under multiplex driving now mount a normally black type liquid crystal display having a very low display luminance in a background display area and dark display areas. Most of them are monochromatic displays using a single color LED as a backlight, and adopt a twist nematic (TN) type as a liquid crystal display structure.

A vertically aligned liquid crystal display is known which disposes a liquid crystal cell of a vertical alignment mode in which liquid crystal molecules in a liquid crystal layer are aligned vertically or approximately vertically between upper and lower glass substrates sandwiching the liquid crystal layer, between approximately crossed-Nichol disposed polarizers. As this vertical alignment type liquid crystal display is observed normal direction of a glass substrate, the optical characteristics become almost equal to those of the crossed-Nichol disposed polarizers. Therefore, an optical transmissivity becomes very low, and it is possible to realize a high contrast ratio relatively easily. The vertical alignment type liquid crystal display allows good normally black image display independent from an emission wavelength of a backlight.

An invention of a liquid crystal display is disclosed (for example, refer to Japanese Patent No. 2047880) in which an optical film having negative uniaxial optical anisotropy or an optical film (negative biaxial film) having negative biaxial optical anisotropy is inserted at one or both sides between the upper polarizer and upper glass substrate and between the lower polarizer and lower glass substrate. Even if the liquid crystal display is observed along an oblique direction, it is possible to suppress a rise in optical transmissivity and a fall in contrast ratio so that good image display can be realized.

For this viewing angle compensation method described in Japanese Patent No. 2047880, effective conditions have been proposed (for example, refer to Japanese Patent No. 3330574) for an inplane retardation and an arrangement of an in-plane slow axis, respectively of a negative biaxial film.

As an optical film (negative C plate) having negative uniaxial optical anisotropy, a biaxially stretching film is distributed in markets which is formed by stretched triacethyl cellulose (TAC) resin formed in a film shape by a melting cast method or norbornene base cyclic olefin polymer (norbornene COP) resin formed in a film shape by a melting extrude method, the resin having been used as a material of a protective film of a polarizer, along a film extrude direction and its perpendicular direction.

As a negative biaxial film, there are a film formed by uniaxially stretched specific TAC resin along a direction perpendicular to a film longitudinal direction, and a film formed by biaxially stretched norbornene COP resin. These films are used, for example, in a liquid crystal television, and distributed in markets by a larger amount than negative C plates.

Most of negative C plates made of a commercially available TAC film have a retardation Rth of 50 nm or smaller in a thickness direction. A negative C plate made of a commercially available norbornene COP film has also a retardation Rth of 300 nm or smaller in a thickness direction. An optical film having Rth larger than 300 nm is not presently distributed in markets, although it is known that this film can be made of cholesteric liquid crystal polymer.

Commercially available negative biaxial films have an in-plane retardation Re of 0 nm<Re≦300 nm, both for stretched TAC and norbornene COP, and most of them have Re of 20 nm<Re≦300 nm. A maximum retardation in a thickness direction is about 220 nm to 350 nm.

Supplementary description will be made on an optical film prior to making detailed description of conventional examples and embodiments.

An optical film having negative uniaxial optical anisotropy (negative C plate) has a relation of nx≈ny>nz, and an optical film having negative biaxial optical anisotropy has a relation of nx>ny>nz, where nx and ny are in-plane refractive indices of an optical film, and nz is an out of plane refractive index along a thickness direction.

As an Nz factor is defined by $Nz=(nx-nz)/(nx-ny)$, negative uniaxial optical anisotropy is $N\approx\infty$ and negative biaxial optical anisotropy is $1<Nz<\infty$.

Nz=1 indicates positive uniaxial optical anisotropy, and an optical film having positive uniaxial optical anisotropy is called an A plate. An A plate is nx>ny=nz. Nz<1 indicates mainly positive biaxial optical anisotropy. However, a case of Nz=0 and Nz=−∞ is excluded because only one optical axis exists. An optical film of Nz=0 is called a negative A plate, whereas an optical film of Nz=−∞ is called a positive C plate.

An in-plane retardation Re of an optical film is defined by $Re=(nx-ny)*d$ where d is a film thickness, and a thickness direction retardation Rth is defined by $Rth=[\{(nx-ny)/2\}-nz]*d$.

FIGS. 10A and 10B are schematic configurations of liquid crystal displays according to conventional examples. Japanese Patent No. 3330574 discloses techniques assuming the structures of these liquid crystal displays.

FIG. 10A is a schematic diagram illustrating the liquid crystal display of a first conventional example Between an upper polarizer 10 and a lower polarizer 20 crossed-Nichol disposed, a mono domain vertical alignment liquid crystal cell 30 is disposed. The mono domain vertical alignment liquid crystal cell 30 is constituted of an upper glass substrate (transparent substrate) 4, a lower glass substrate (transparent substrate) 6 and a mono domain vertical alignment liquid crystal layer 5 squeezed between both substrates 4 and 6. A single first optical film 3, e.g., norbornene COP biaxially stretched film, is disposed between the upper glass substrate 4 of the vertical alignment liquid crystal cell 30 and the upper polarizer 10.

The upper and lower polarizers 10 and 20 each have the structure that a polarizing layer 1 is disposed on a TAC base film 2. For example, the polarizing layer 1 is made of stretched polyvinyl alcohol.

In the directional coordinate system shown wherein a right/left direction of the liquid crystal display is defined as a 180°-0° (9 o'clock-3 o'clock) direction, an absorption axis Fab of the polarizing layer 1 of the upper polarizer 10 is set along the 135° direction, and an absorption axis Rab of the polarizing layer 1 of the lower polarizer 20 is set along the 45° direction. An in-plane slow axis SA1 of the first optical film 3 is set along the 45° direction.

As described earlier, the thickness direction retardation Rth of the first optical film can be set to only 300 nm or smaller. Therefore, if a retardation Δnd of the liquid crystal layer 5 of the liquid crystal display of the first conventional example is large, good viewing angle compensation cannot be obtained in a background area and dark display areas.

FIG. 10B is a schematic diagram illustrating the liquid crystal display of a second conventional example. A different point from the first conventional example resides in that between a lower glass substrate 6 of a vertical alignment liquid crystal cell 30 and a lower polarizer 20, a single second optical film 7, e.g., norbornene COP biaxially stretched film, is disposed. An in-plane slow axis SA2 of the second optical film 7 is set along the 135° direction. The first conventional example is a liquid crystal display of one-side compensation, whereas the second conventional example is a liquid crystal display of both-side compensation.

In the liquid crystal display of the second conventional example, the retardation in the thickness direction of the optical films can be set to about 600 nm at a maximum as a total sum of the first and second optical films. However, as the liquid crystal display is observed at a large polar angle along the normal direction of the right/left direction (180°-0° direction) set along 45° direction relative to the absorption axes Fab and Rab of the upper and lower polarizers 10 and 20, an optical transmissivity in the bright display area becomes extremely low, and display image cannot be visually recognized at all in some cases.

The present inventor obtained right/left direction viewing angle characteristics during bright image display of the liquid crystal displays of the first and second conventional examples. "LCDMASTER6.16" manufactured by SHIN-TECH, Inc. was used as a simulator. The same simulator was used for other simulations in this specification.

For both the first and second conventional examples, the vertical alignment liquid crystal cell 30 was structured to have anti-paralleled mono domain alignment having a pretilt angle of 89.9° on the substrate surface and the six o'clock direction (270° direction) alignment of central molecules of the liquid crystal layer 5, by using liquid crystal material having negative dielectric anisotropy Δ∈. A retardation Δnd of the liquid crystal layer was set to about 430 nm for the first conventional example, and to about 445 nm for the second conventional example. SHC13U manufactured by Polatechno Co. Ltd was used as the upper and lower polarizers 10 and 20, and an in-plane retardation of the TAC base film 2 was set to 3 nm, and a thickness direction retardation was set to 50 nm.

The first and second optical films 3 and 7 are made of a biaxially stretched norbornene COP film, as described above. For simulation, an in-plain retardation of the first optical film 3 of the first conventional example was set to 50 nm and a thickness direction retardation was set to 300 nm. For the second conventional example, in-plane retardations of the first and second optical films 3 and 7 were set both to 30 nm, and thickness direction retardations were set both to 150 nm. Both the first and second conventional examples provide the optimum optical film conditions of an optical transmissivity smaller than 0.03% as viewed at a right direction polar angle of 50° under the absence of applied voltage.

FIG. 11 is a graph illustrating the right/left direction viewing angle characteristics with an optical transmissivity of observation from normal direction of liquid crystal display being set to about 15%.

The abscissa of the graph represents a right/left direction observation angle in the unit of "°", and the ordinate represents an optical transmissivity in the unit of "%". A curve a indicates right/left observation viewing angle characteristics of the liquid crystal display (one-side compensation) of the first conventional example, and a curve b indicates right/left observation viewing angle characteristics of the liquid crystal display (both-side compensation) of the second conventional example.

It can be seen from the graph that an optical transmissivity of the liquid crystal display of the first conventional example is higher than that of the second conventional example, at an observation angle larger than a polar angle of 50°. Right/left symmetry of the liquid crystal display (both-side compensation) of the second conventional example is better than that of the first conventional example.

The present inventor actually manufactured the liquid crystal displays of the first and second conventional examples. It has been found that the second conventional example has the tendency that color shift is observed remarkably at a large angle, and this tendency is not proper from the viewpoint of outer appearance of the display.

In order to obtain a larger display capacity, i.e., a duty ratio, a liquid crystal display by using multiplex driving, it is necessary that steepness of the electro-optical characteristics is good. In the case of a vertical alignment type liquid crystal display, steepness is reflected upon a display luminance because a transmissivity in the bright display area is greatly influenced.

If a display capacity is desired to be made larger than that of a ¼ duty driving condition, it is preferable to set a retardation Δnd of a liquid crystal layer larger than 300 nm, and more preferably larger than 360 nm. If a display capacity is desired to be made larger than that of a ¹⁄₁₆ duty driving condition, it is preferable to set a retardation Δnd of a liquid crystal layer larger than 550 nm, and more preferably larger than 600 nm. It is considered that even if the liquid crystal displays of the first and second conventional examples are manufactured by using commercially available optical films, it is difficult to obtain good image display performance.

SUMMARY OF THE INVENTION

An object of the present invention is to provide a liquid crystal display capable of realizing good image display.

According to one aspect of the present invention, there is provided a liquid crystal display includes: first and second transparent substrates; a liquid crystal layer squeezed between the first and second transparent substrates and vertically aligned at a retardation of 300 nm or larger to 1000 nm or smaller; first and second viewing angle compensators disposed on the first transparent substrate on a side opposite to the liquid crystal layer and having negative biaxial optical anisotropy; a first polarizer disposed on the first and second viewing angle compensators on a side opposite to the first transparent substrate; and a second polarizer disposed on the second transparent substrate on a side opposite to the liquid crystal layer, the second polarizer being crossed-Nichol disposed with said first polarizer, wherein: the second viewing angle compensator is disposed between the first transparent substrate and first viewing angle compensator; an in-plane slow axis of the first viewing angle compensator is disposed perpendicular to an absorption axis of the first polarizer; the in-plane slow axis of the first viewing angle compensator is disposed perpendicular to an in-plane slow axis of the second viewing angle compensator; and a retardation in an in-plane direction of the first viewing angle compensator is larger than a retardation in an in-plane direction of the second viewing angle compensator.

According to another aspect of the present invention, there is provided a liquid crystal display including: first and second transparent substrates; a liquid crystal layer squeezed between the first and second transparent substrates and vertically aligned at a retardation of 200 nm or larger to 500 nm or smaller; first and second viewing angle compensators disposed on the first transparent substrate on a side opposite to the liquid crystal layer, at least one of the first and second viewing angle compensators being an A plate, and the other being a viewing angle compensator having negative optical anisotropy if both are not an A plate; a first polarizer disposed on the first and second viewing angle compensators on a side opposite to the first transparent substrate; and a second polarizer disposed on the second transparent substrate on a side opposite to the liquid crystal layer, the second polarizer being crossed-Nichol disposed with said first polarizer, wherein: the second viewing angle compensator is disposed between the first transparent substrate and first viewing angle compensator; an in-plane slow axis of the first viewing angle compensator is disposed perpendicular to an absorption axis of the first polarizer; the in-plane slow axis of the first viewing angle compensator is disposed perpendicular to an in-plane slow axis of the second viewing angle compensator; and a retardation in an in-plane direction of the first viewing angle compensator is larger than a retardation in an in-plane direction of the second viewing angle compensator.

According to the present invention, it is possible to provide a liquid crystal display capable of realizing good image display.

DESCRIPTION OF THE PREFERRED EMBODIMENTS

Figure 1:
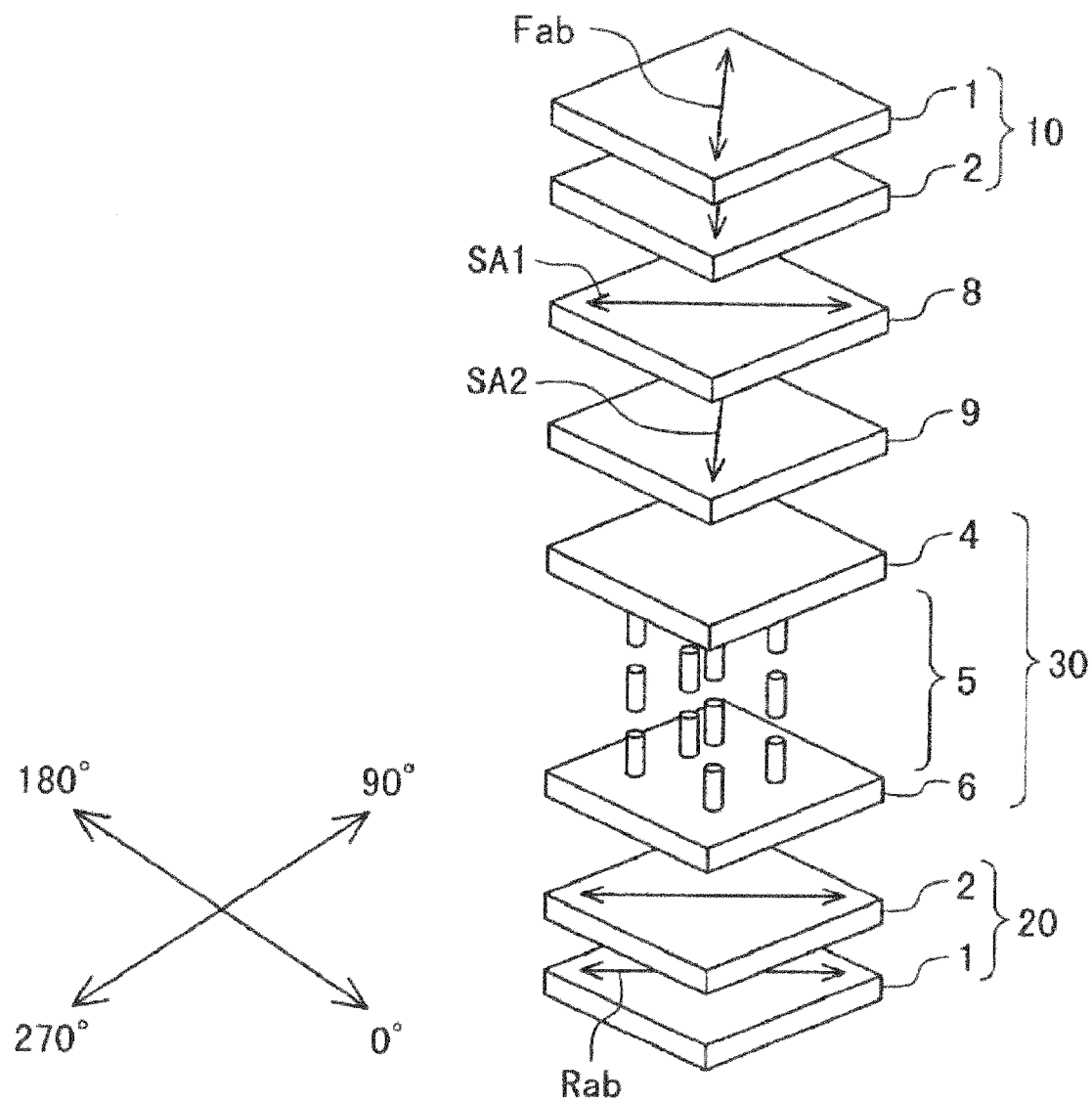
FIG. 1 is a schematic diagram illustrating a liquid crystal display according to an embodiment.

FIG. 1 is a schematic diagram illustrating a liquid crystal display according to an embodiment.

Between an upper polarizer 10 and a lower polarizer 20 generally crossed-Nichol disposed, a liquid crystal layer, e.g., a mono domain vertical alignment liquid crystal cell 30, is disposed having a vertical alignment liquid crystal layer subjected to a vertical or generally vertical alignment process. The mono domain vertical alignment liquid crystal cell 30 is constituted of an upper glass substrate (transparent substrate) 4, a lower glass substrate (transparent substrate) 6 and a mono domain vertical alignment liquid crystal layer 5 squeezed between both substrates 4 and 6. Between the upper glass substrate 4 of the vertical alignment liquid crystal cell 30 and the upper polarizer 10, a first optical film 8 and a second optical film 9 are disposed sequentially in this order from the upper polarizer 10 side. Both the optical films 8 and 9 may use, e.g., norbornene COP stretched film.

The upper and lower polarizers 10 and 20 may use, e.g., SHC13U manufactured by Polatechno Co. Ltd. The upper and lower polarizers 10 and 20 each have the structure that a polarizing layer 1 is disposed on a TAC base film 2. For example, the polarizing layer 1 is made of stretched polyvinyl alcohol Although not shown, a TAC film serving as a protective film is laminated on the upper and lower polarizers 10 and 20 on the outer sides of the liquid crystal display.

An in-plane slow axis SA1 of the first optical film 8 disposed in proximity with the upper polarizer 10 is disposed approximately perpendicular to an absorption axis Fab of the upper polarizer 10. An in-plane slow axis SA2 of the second optical film 9 disposed between the first optical film 8 and vertical alignment liquid crystal cell 30 is disposed approximately perpendicular to the in-plane slow axis SA1 of the first optical axis 8.

In the directional coordinate system shown wherein a right/left direction of the liquid crystal display is defined as a 180°-0° (9 o'clock-3 o'clock) direction, the absorption axis Fab of the upper polarizer 10 is set along the 135° direction, the absorption axis Rab of the lower polarizer 20 is set along the 45° direction, and the in-plane slow axis SA2 of the second optical film 9 is set along the 135° direction The vertical alignment liquid crystal layer 5 is made of, e.g., liquid crystal material manufactured by Merch Japan and having a refractive index anisotropy Δn<0.1 and a dielectric anisotropy Δε<−5.1. An alignment film is formed on the upper and lower glass substrates 4 and 6 on the liquid crystal layer 5 side, by using, e.g., alignment film material SE1211 manufactured by Nissan Chemical Industries, Ltd. The alignment film is subjected to an anti-paralleled mono domain vertical alignment process to realize a pretilt angle of approximately 90°, e.g., 89.9° relative to the substrate surface. An alignment direction of central liquid crystal molecules in the vertical alignment liquid crystal layer 5 is a six o'clock (270°) direction.

Transparent electrodes, e.g. ITO electrodes, are disposed on the upper and lower glass substrates 4 and 6 and inner than the alignment films to thereby change an alignment state of liquid crystal molecules in the liquid crystal layer 5 and switch a display pattern of the liquid crystal display The present inventor made simulation analysis by changing in various ways the first and second optical films 8 and 9 of the liquid crystal display of the embodiment, and checked the conditions of realizing good image display.

(I) First, the viewing angle characteristics in the absence of applied voltage, i.e., the viewing angle characteristics in the display background area, of the liquid crystal display was simulated by using negative biaxial films for both the first and second optical films 8 and 9.

(i) Studied first was the case in which the thickness direction retardations Rth1 and Rth2 of the first and second optical films 8 and 9 are equal (Rth1=Rth2). Analyzed was the liquid crystal layer retardation Δnd dependency of the background area optical transmissivity under observation at a right direction polar angle of 50°, for each of Rth1(=Rth2)=90 nm, 180 nm and 300 nm. The analysis was performed under various conditions of the in-plane retardations Re1 and Re2 of the first and second optical films 8 and 9, and under each condition, Δnd was searched minimizing the background area optical transmissivity under observation at the right direction polar angle of 50°.

Figure 2A:
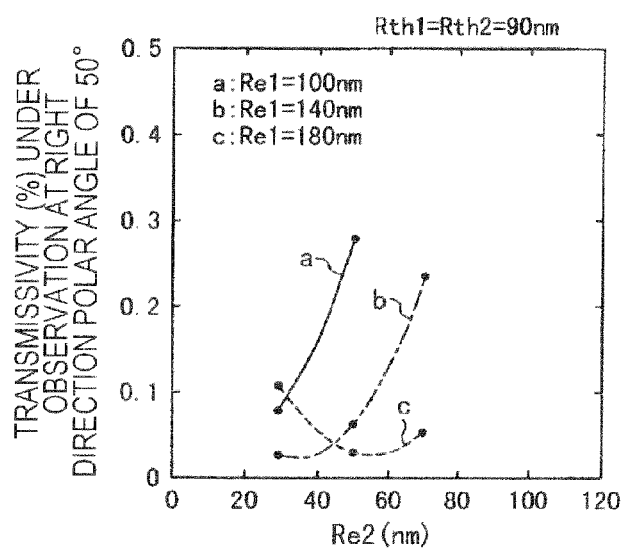
FIGS. 2A to 2C are graphs illustrating analysis results of an Re2 dependency of an optical transmissivity under observation at a right direction polar angle of 50°, Re1 being used as a parameter.
Figure 2B:
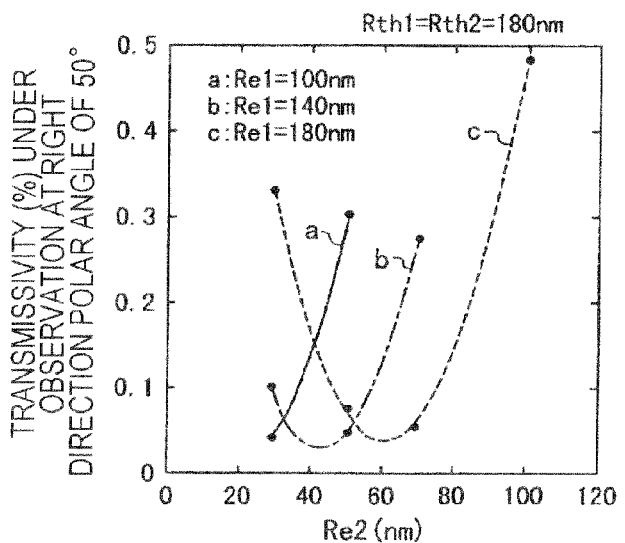
Figure 2C:
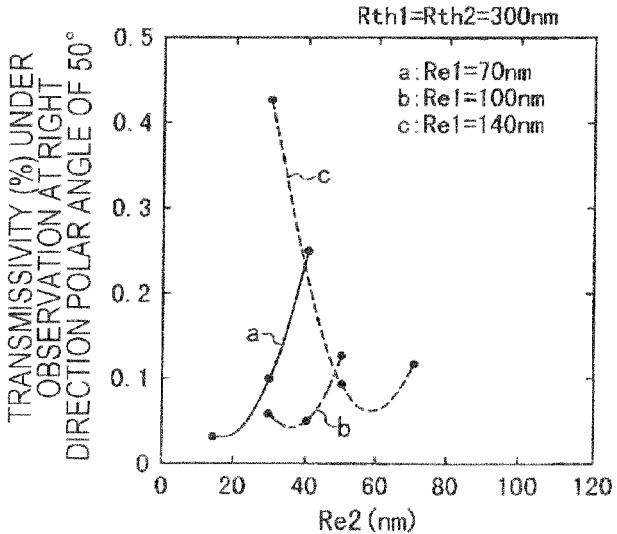

FIGS. 2 to 2C are graphs illustrating analysis results of the Re2 dependency of an optical transmissivity under observation at the right direction polar angle of 50°, Re1 being used as a parameter. The abscissas of the graphs in FIGS. 2A to 2C represent all Re2 in the unit of "nm", and the ordinates represent all an optical transmissivity under observation at the right direction polar angle of 50° in the unit of "%".

The graphs of FIGS. 2A, 2B and 2C illustrate the analysis results at Rth1(=Rth2) of 90 nm, 180 nm and 300 nm, respectively. A range of Rth1 and Rth2 able to be realized by presently commercially available norbornene COP is probably 90 nm≦Rth1, Rth2≦300 nm.

In FIGS. 2A and 2B, a relation between Re2 and an optical transmissivity at Re1=100 nm is indicated by a curve a. This relation at Re1=140 nm is indicated by a curve b. A curve c indicates the relation at Re1=180 nm. In FIG. 2C, the relations at Re1=70 nm, 100 nm and 140 nm are indicated by curves a, b and c, respectively, It can be seen that the curves a to c, in any one of the graphs of FIGS. 2A to 2C are secondary functional curves. Namely, it can be recognized that the optical transmissivity under observation at the right direction polar angle of 50° under each Re1 condition indicates secondary functional dependency taking a minimum value at some Re2. It can also seen that good background viewing angle characteristics can be obtained if Re1 is in a range of 70 nm≦Re1≦180 nm, preferably in a range of 100 nm≦Re1≦150, and if Re2 is in a range of 15 nm≦Re2≦70 nm, preferably in a range of 15 nm≦Re2≦60 nm. In these ranges, Re1>Re2 for all Rth1(=Rth2) conditions.

Figure 3A:
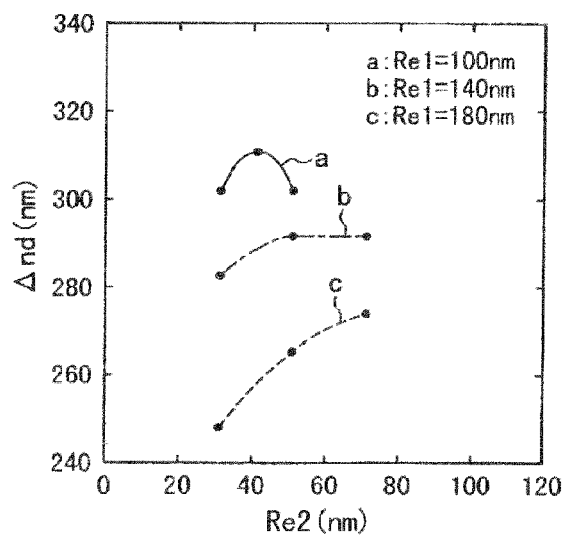
FIGS. 3A to 3C are graphs illustrating analysis results of an Re2 dependency of a liquid crystal layer retardation Δnd minimizing an optical transmissivity under observation at a right direction polar angle of 50°, Re1 being used as a parameter.
Figure 3B:
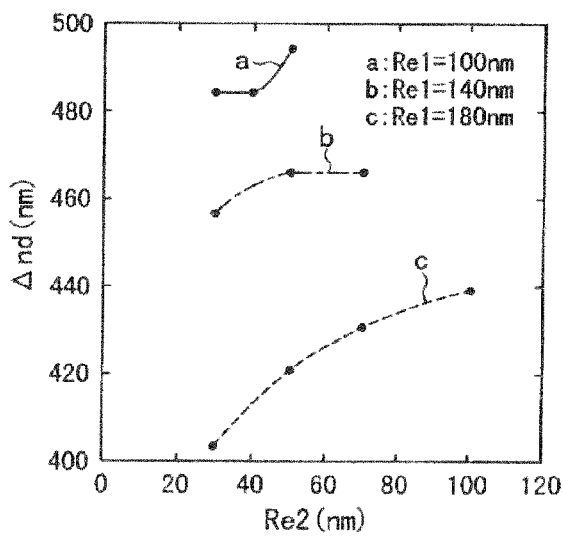
Figure 3C:
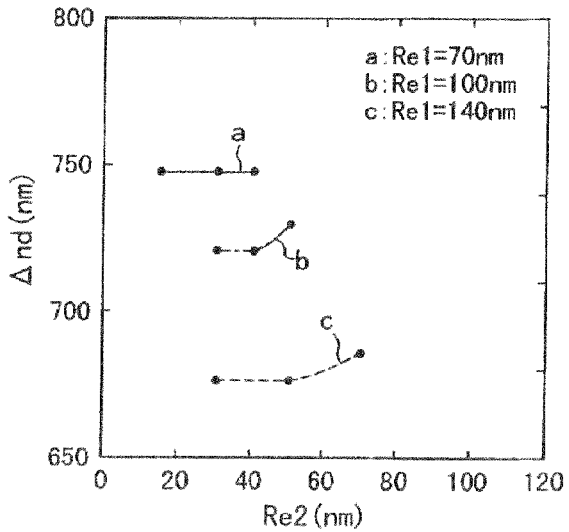

FIGS. 3A to 3C are graphs illustrating the Re2 dependency of a liquid crystal layer retardation Δnd minimizing an optical transmissivity under observation at the right direction polar angle of 50°, Re1 being used as a parameter. The abscissas of the graphs in FIGS. 3A to 3C represent all Re2 in the unit of "nm", and the ordinates represent all a liquid crystal layer retardation Δnd minimizing an optical transmissivity under observation at the right direction polar angle of 50°, in the unit of "%".

Similar to FIGS. 2A to 2C, the graphs of FIGS. 3A, 3B and 3C illustrate the analysis results at Rth1(=Rth2) of 90 nm, 180 nm and 300 nm, respectively.

In FIGS. 3A and 3B, a relation between Re2 and Δnd at Re1=100 nm is indicated by a curve a. This relation at Re1=140 nm is indicated by a curve b. A curve c indicates the relation at Re1=180 nm. In FIG. 3C, the relations at Re1=70 nm, 100 nm and 140 nm are indicated by curves a, b and c, respectively.

It can be seen from the graphs of FIGS. 3A to 3C that the liquid crystal retardation Δnd minimizing an optical transmissivity under observation at the right direction polar angle of 50° becomes larger as Re1 becomes smaller under any one of the Rth1(=Rth2) conditions. It is also recognized that there is the tendency that this liquid crystal retardation becomes larger as Re2 becomes larger. It can be seen also that good background viewing angle characteristics can be obtained if the liquid crystal layer retardation Δnd is in a range of 250 nm≦Δnd≦1000 nm, preferably in a range of 300 nm≦Δnd≦750 nm.

(ii) Next, the present inventor made simulation analysis also for the case in which the thickness direction retardations Rth1 and Rth2 of the first and second optical films 8 and 9 are different. The Re2 (in-plane retardation of the second optical film 9) dependency of the background area optical transmissivity under observation at the right direction polar angle of 50° was calculated by fixing the in-plane retardation Re1 of the first optical film 8 to 180 nm and the thickness direction retardation Rth1 to 180 nm, and by changing the thickness direction retardation Rth2 of the second optical film 9 to 90 nm, 180 nm and 300 nm. In the simulation, the liquid crystal layer retardation Δnd was changed properly to minimize the background area optical transmissivity.

Figure 4:
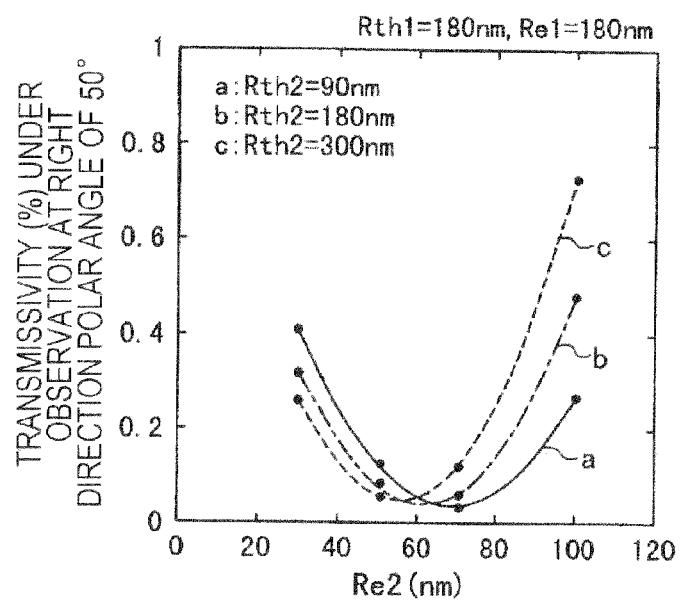
FIG. 4 is a graph illustrating a relation between Re2 and an optical transmissivity under observation at a right direction polar angle of 50°.

FIG. 4 is a graph illustrating calculation results. The abscissa of the graph represent Re2 in the unit of "nm", and the ordinate represents an optical transmissivity under observation as the right direction polar angle of 50°, in the unit of "%".

Curves a, b and c indicate the relations between Re2 and an optical transmissivity at Rth=90 nm, 180 nm and 300 nm, respectively.

It can be understood from FIG. 4 that there is the tendency that if Rth1>Rth2 (curve a), a better optical transmissivity (lower optical transmissivity) is obtained under a large Re2 condition, whereas if Rth1<Rth2 (curve c), a better optical transmissivity (lower optical transmissivity) is obtained under a small Re2 condition. However, the good background viewing angle characteristics are realized in any one of both the cases.

It can be recognized from these studies that good background viewing angle characteristics can be realized if Rth1≦Rth2 (cures b and c) and 100 nm≦Re1≦150 nm, and 15 nm≦Re2≦60 nm.

Figure 5:
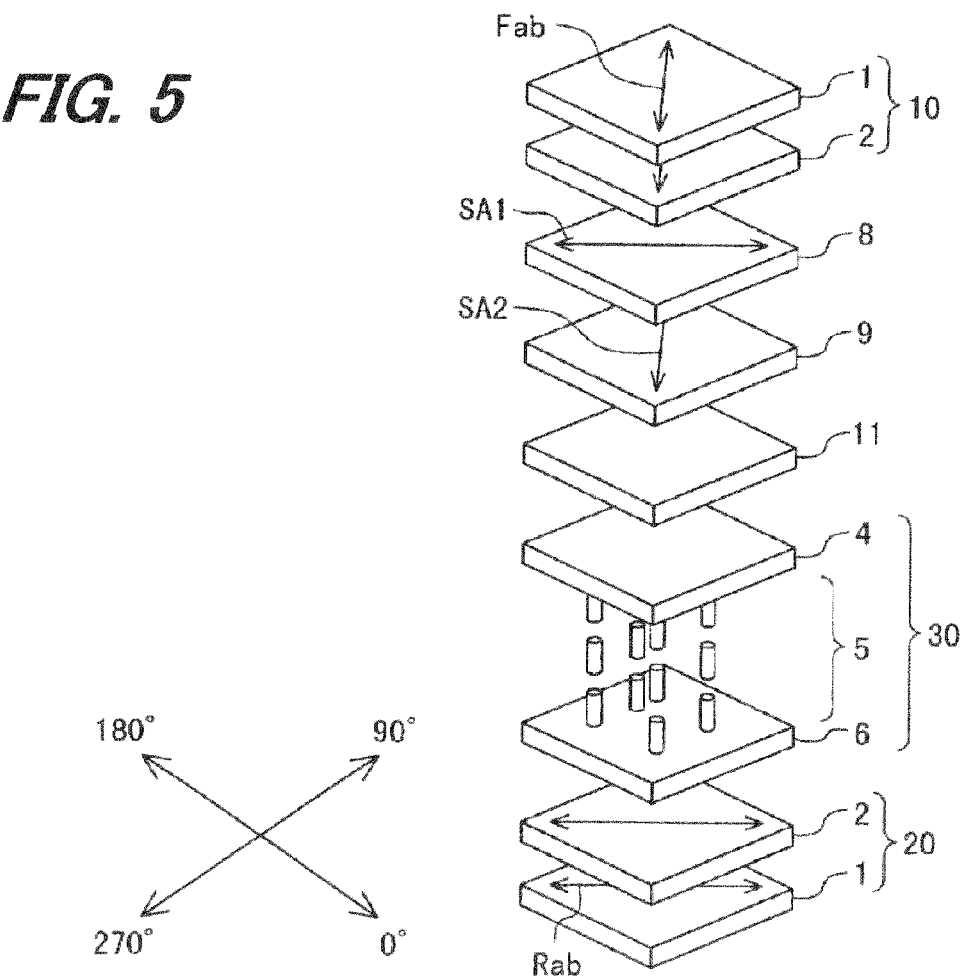
FIG. 5 is a schematic diagram of a liquid crystal display according to a modification.

(iii) FIG. 5 is a schematic diagram illustrating a liquid crystal display according to a modification. The liquid crystal display of the modification is different from the liquid crystal display of the embodiment in that a negative C plate 11 is disposed between an upper glass substrate 4 and a second optical film 9. In the liquid crystal display illustrated in FIG. 5, although a single negative C plate 11 is disposed, a plurality of negative C plates may be disposed.

The liquid crystal display of the modification can realize good viewing angle characteristics even a retardation Δnd of a liquid crystal layer 5 is, for example, larger than 750 nm. However, as Δnd is made large, there arises the tendency that optical transmissivity increases at a large polar observation angle, and furthermore, an in-plane uniformity of Δnd settings becomes severe. The present inventor manufactured liquid crystal displays and confirmed that good image display is possible at Δnd up to about 1000 nm.

Figure 10A:
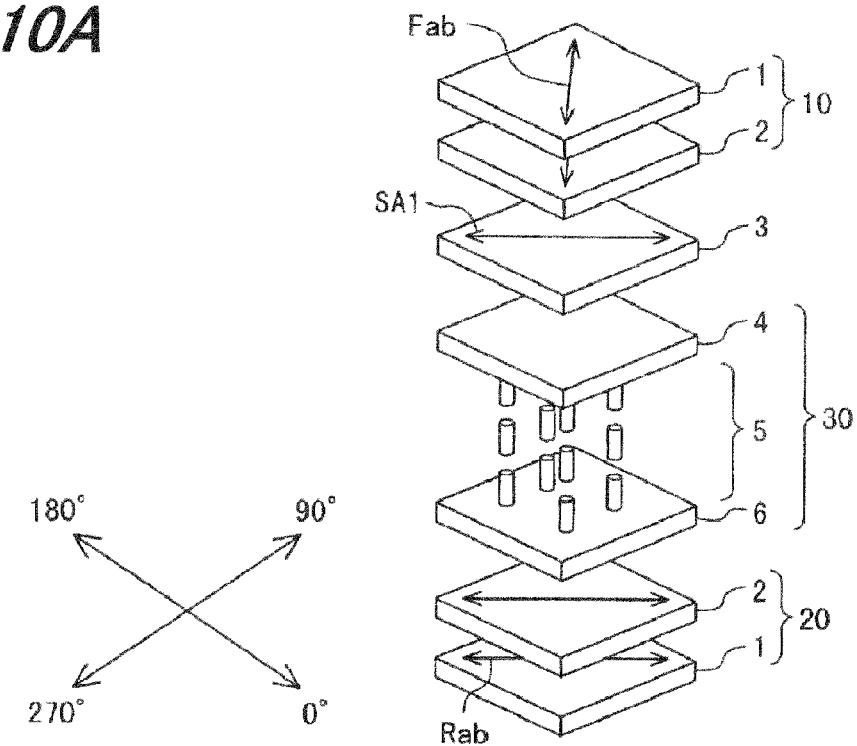
FIGS. 10A and 10B are schematic diagrams illustrating liquid crystal displays according to conventional examples.
Figure 10B:
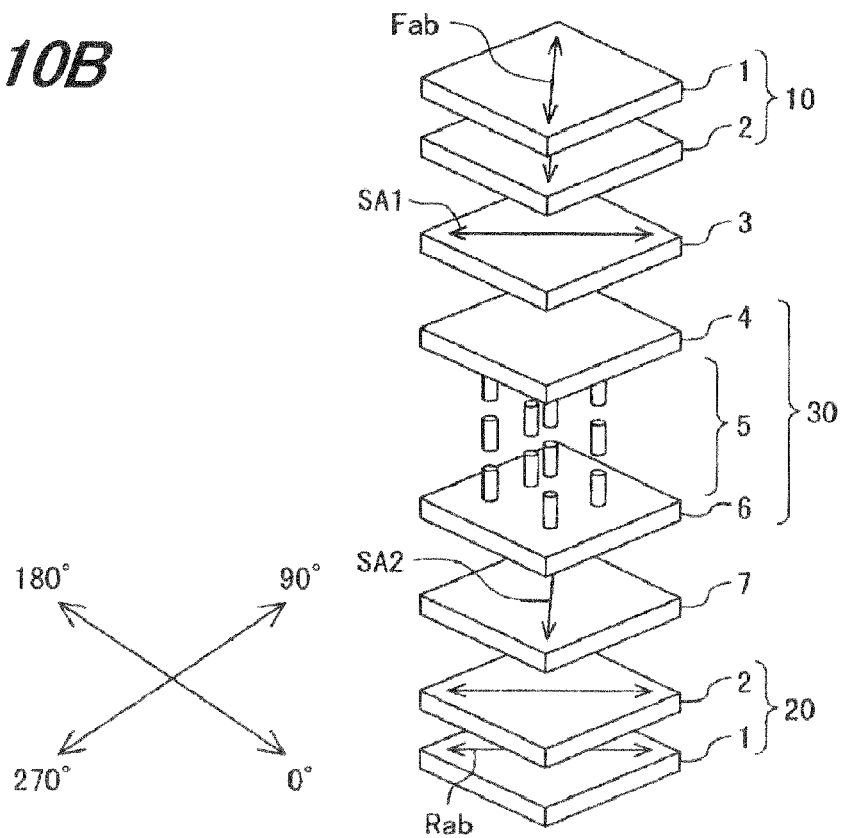
Figure 11:
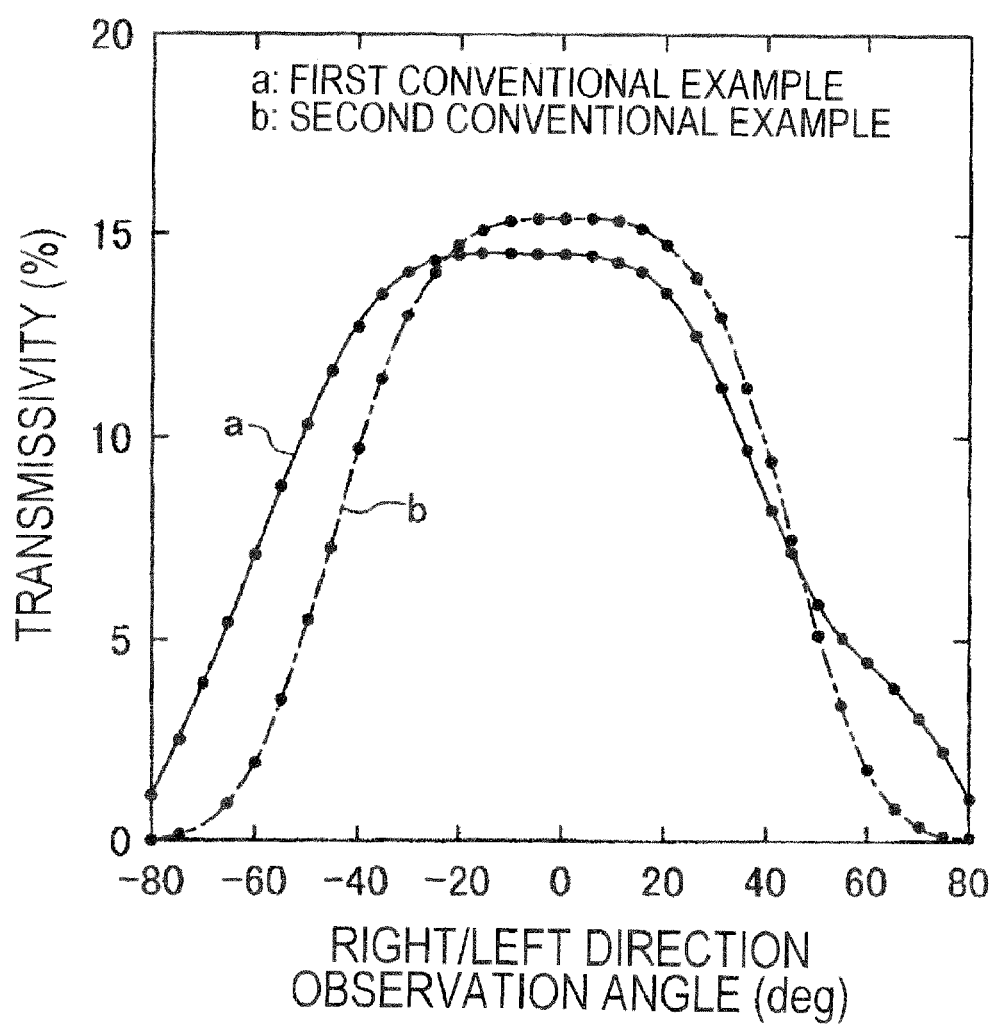
FIG. 11 is a graph illustrating right/left direction viewing angle characteristics under front observation with an optical transmissivity being set to about 15%.

The present inventor has also studied the right/left direction viewing angle characteristics of the liquid crystal displays of the embodiment and modification in the presence of applied voltage It has been found that the optical transmissivity characteristics are right/left asymmetric similar to the first conventional example (one-side compensation) illustrated in FIG. 10A. However, it has been confirmed that definite defects of an optical transmissivity are not observed at a large polar observation angle and that color shift is clearly smaller than that of the second conventional example (both-side compensation) illustrated in FIG. 10B.

(II) Next, the present inventor made simulation analysis similar to that described in (I), for the case in which an A plate is used as one or both of the first and second optical films 8 and 9 in the structure of the liquid crystal display of the embodiment illustrated in FIG. 1.

Use of the A plate may not work effectively if a high Δnd is set to the liquid crystal display to increase the thickness direction retardation. However, since only a uniaxial stretching process is used, a manufacture cost can be reduced.

(i) The present inventor has studied first the liquid crystal display having an A plate as the first optical film 8. The present inventor has analyzed a relation between Re1 (in-plane retardation of the first optical film 8) and Re2 (in-plane retardation of the second optical film 9) minimizing a background area optical transmissivity under observation at the right direction polar angle of 50°, when a negative biaxial film having a thickness direction retardation Rth2=90 nm, 180 nm and 300 nm is used as the second optical film 9, and when an A plate is used also as the second optical film 9 (Rth2=Re2/2). For this analysis, a retardation Δnd of the liquid crystal layer 5 was changed properly with a change in optical parameter of the first and second optical films 8 and 9.

Figure 6:
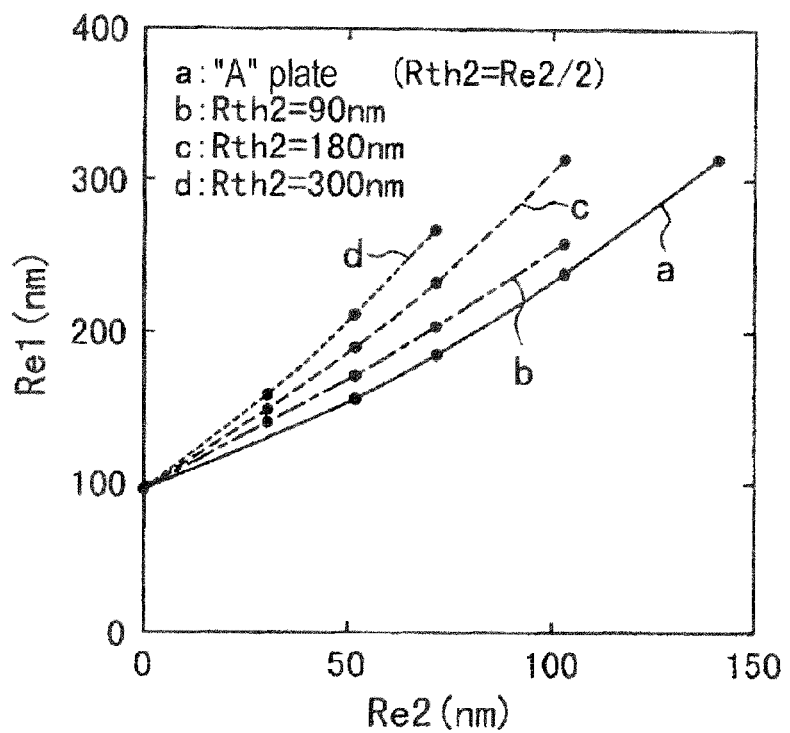
FIG. 6 is a graph illustrating a relation between Re1 and Re2.

FIG. 6 is a graph illustrating analysis results. The abscissa of the graph represents Re2 and the ordinate represents Re1, respectively in the unit of "nm". A curve a indicates the relation between Re1 and Re2 when the second optical film 9 is an A plate. Curves b, c and d indicate the relation between Re1 and Re2 when a negative biaxial film having the thickness direction retardation Rth2=90 nm, 180 nm and 300 nm is used as the second optical film 9, respectively.

It can be seen from the graph that Re1 and Re2 have an approximately proportional relation under any one of the conditions. It is also recognized that Re1>Re2. It can be seen also that as a value of Rth2 becomes large, a difference between Re1 and Re2 increases. Under any one of the conditions, an in-plane retardation Re1 of the first optical film 8 (A plate in this analysis) is effective in a range of 100 nm≦Re1–300 nm. Since an in-plane retardation of an A plate easily available is in a range of 100 nm or larger and 150 nm or smaller, and in a range of 250 nm or larger and 300 nm or smaller, the in-plane retardation is adjusted preferably in these ranges.

Figure 7:
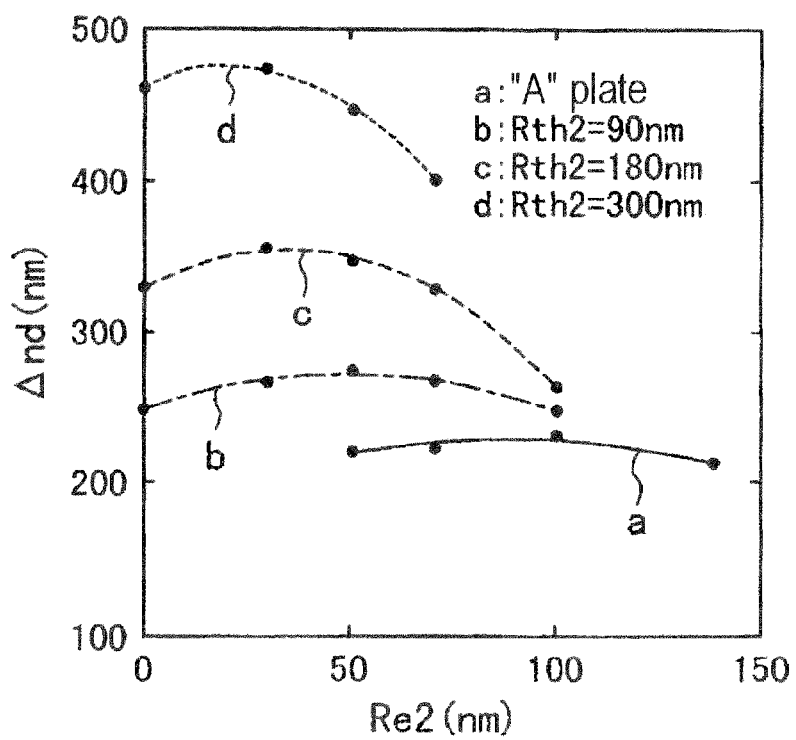
FIG. 7 is a graph illustrating a relation between Re2 and a retardation Δnd of a liquid crystal layer 5.

FIG. 7 is a graph illustrating the relation between Re2 and a retardation Δnd of the liquid crystal layer 5 under the condition applied to the analysis. The abscissa of the graph represents Re2 and the ordinate represents a retardation Δnd of the liquid crystal layer 5, respectively in the unit of "nm". A curve a indicates the relation when the second optical film 9 is an A plate. Curves b, c and d indicate the relation when a negative biaxial film having the thickness direction retardation Rth2=90 nm 180 nm and 300 nm is used as the second optical film 9, respectively.

It can be seen that upward convex secondary functional correlation exists between Re2 and Δnd. In order to set a maximum Δnd under each condition, it can be seen that the larger a value of Rth2, Re2 is made smaller Re2 is preferably in a range of 0 nm≦Re2≦150 nm, and more preferably in a range of 4500/Rth2–10 nm≦Re2≦4500/Rth2+10 nm.

(ii) Next, simulation analysis was performed for the case in which the first optical film 8 is a negative biaxial film and the second optical film 9 is an A plate. A relation between Re1 and Re2 minimizing a background area optical transmissivity under observation at the right direction polar angle of 50° was studied for each of the thickness direction retardations Rth1 of the first optical film (negative biaxial film) 8 of 90 nm, 180 nm and 300 nm. The retardation Δnd of the liquid crystal layer 5 was adjusted properly to be optimum, in accordance with the values of Re1, Re2 and Rth1.

Figure 8:
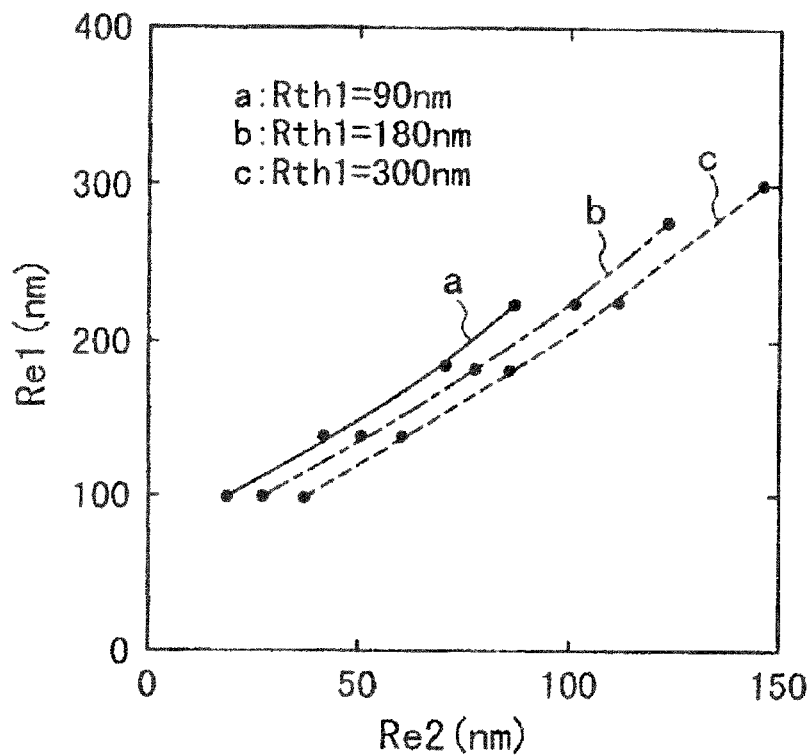
FIG. 8 is a graph illustrating a correlation between Re1 and Re2 under each Rth1 condition.

FIG. 8 is a graph illustrating correlation between Re1 and Re2 under each Rth1 condition. The abscissa of the graph represents Re2 and the ordinate represents Re1, respectively in the unit of "nm". Curves a, b and c indicate the relation between Re1 and Re2 at Rth=90 nm, 180 nm and 300 nm, respectively.

It can be seen from the graph that Ret and Re2 have an approximately proportional relation under any one of the Rth1 conditions. It can be recognized that Re1>Re2. It can be seen also that the larger a value of Rth1, a difference between Re1 and Re2 increases.

Figure 9:
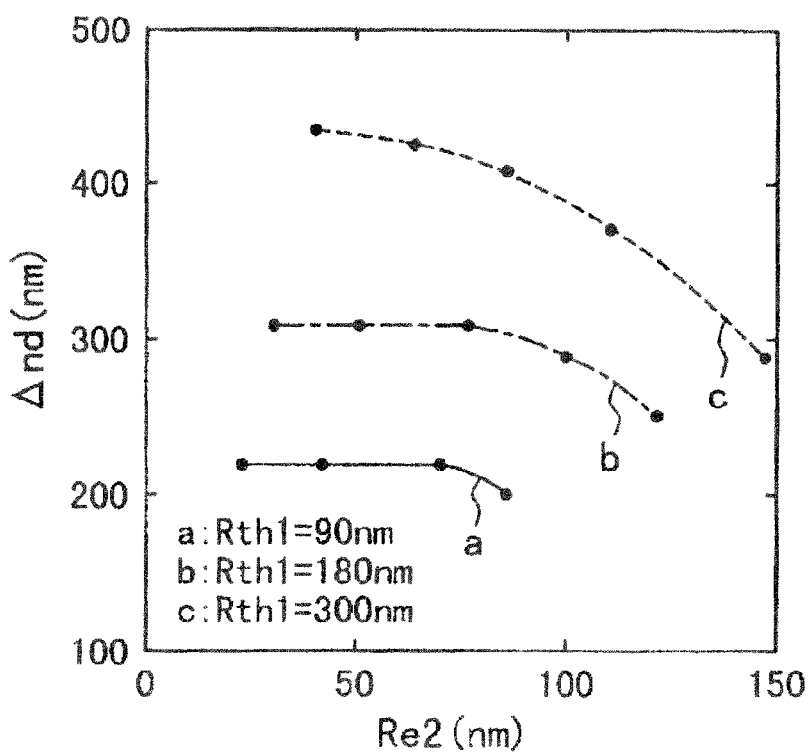
FIG. 9 is a graph illustrating a relation between a retardation Δnd of the liquid crystal layer 5 and Re2 minimizing a background optical transmissivity under observation at a right direction polar angle of 50°.

FIG. 9 is a graph illustrating the relation between Re2 minimizing a background area optical transmissivity under observation at the right direction polar angle of 50° and a retardation Δnd of the liquid crystal layer 5. The abscissa of the graph represents Re2 and the ordinate represents a retardation Δnd of the liquid crystal layer 5, respectively in the unit of "nm". Curves a, b and c indicate the relation between Re2 and Δnd at Rth=90 nm, 180 nm and 300 nm, respectively.

It can be seen from the graph that there is the tendency that the smaller a value of Re2, Δnd can be set larger in any one of the Rth conditions. It is expected that Re2 is preferably set to 100 nm or smaller, and more preferably 70 nm or smaller. As FIG. 8 is referred to, it is preferable to set Re1 to 140 nm or smaller, particularly 100 nm or larger and 140 nm or smaller.

(iii) In the case of (II) wherein an A plate is used as one or both of the first and second optical films 8 and 9, a preferable range of the thickness direction retardation Rth1 of the first optical film 8 is considered to be a half (Re1/2) of the in-plane retardation Ret or larger and 300 nm or smaller. Similarly, a preferable range of the thickness direction retardation Rth2 of the second optical film 9 is considered to be a half (Re2/2) of the in-plane retardation Re2 or larger and 300 nm or smaller.

It can be considered further from the results illustrated in FIGS. 7 and 9 that a preferable range of the retardation Δnd of the liquid crystal layer 5 is 200 nm or larger and 500 nm or smaller, and more preferably 300 nm or larger and 450 nm or smaller. In order to realize good background viewing angle characteristics when a large Δnd is set, it is effective that at least one negative C plate 11 is disposed between the upper glass substrate 4 and second optical film 9 as illustrated in FIG. 5.

Although the present invention has been described in connection with the embodiment and conventional examples, the present invention is not limited thereto. It is obvious that various alterations, improvements, combinations and the like can be made by those skilled in the art.

The present invention is applicable to general liquid crystal displays. For example, the present invention is suitable for being applied to a liquid crystal display capable of segment display, dot matrix display and both the segment display and dot matrix display Further, the present invention is suitable for being applied to a TFT driving liquid crystal display and a multiplex driving liquid crystal display having a display capacity of a ¼ duty or higher.

What are claimed are:
1. A liquid crystal display comprising:
   first and second transparent substrates;
   a liquid crystal layer squeezed between said first and second transparent substrates and vertically aligned at a retardation of 300 nm or larger to 1000 nm or smaller;
   first and second viewing angle compensators disposed on said first transparent substrate on a side opposite to said liquid crystal layer and having negative biaxial optical anisotropy;
   a first polarizer disposed on said first and second viewing angle compensators on a side opposite to said first transparent substrate; and a second polarizer disposed on said second transparent substrate on a side opposite to said liquid crystal layer, said second polarizer being crossed-Nichol disposed with said first polarizer, wherein:

said second viewing angle compensator is disposed between said first transparent substrate and said first viewing angle compensator;

an in-plane slow axis of said first viewing angle compensator is disposed perpendicular to an absorption axis of said first polarizer;

the in-plane slow axis of said first viewing angle compensator is disposed perpendicular to an in-plane slow axis of said second viewing angle compensator; and a retardation in an in-plane direction of said first viewing angle compensator is larger than a retardation in an in-plane direction of said second viewing angle compensator.

2. The liquid crystal display according to claim 1, wherein the retardation in the in-plane direction of said first viewing angle compensator is 70 nm or larger and 180 nm or smaller, and the retardation in the in-plane direction of said second viewing angle compensator is 15 nm or larger and 70 nm or smaller.

3. The liquid crystal display according to claim 1, wherein:

the retardation in the in-plane direction of said first viewing angle compensator is 100 nm or larger and 150 nm or smaller;

the retardation in the in-plane direction of said second viewing angle compensator is 15 nm or larger and 60 nm or smaller; and a retardation in a thickness direction of said first viewing angle compensator is a retardation or smaller in the thickness direction of said second viewing angle compensator.

4. The liquid crystal display according to claim 1, wherein the retardation of the liquid crystal layer is 300 nm or larger and 750 nm or smaller.

5. The liquid crystal display according to claim 1, further comprising at least one negative C plate disposed between said first transparent substrate and said second viewing angle compensator.

6. The liquid crystal display according to claim 1, wherein retardations in a thickness direction of said first and second viewing angle compensators are both 90 nm or larger and 300 nm or smaller.

7. A liquid crystal display comprising:

first and second transparent substrates;

a liquid crystal layer squeezed between said first and second transparent substrates and vertically aligned at a retardation of 200 nm or larger to 500 nm or smaller;

first and second viewing angle compensators disposed on said first transparent substrate on a side opposite to said liquid crystal layer, at least one of said first and second viewing angle compensators being an A plate, and the other being a viewing angle compensator having negative optical anisotropy if both are not an A plate;

a first polarizer disposed on said first and second viewing angle compensators on a side opposite to said first transparent substrate; and a second polarizer disposed on said second transparent substrate on a side opposite to said liquid crystal layer, said second polarizer being crossed-Nichol disposed with said first polarizer, wherein:

said second viewing angle compensator is disposed between said first transparent substrate and said first viewing angle compensator;

an in-plane slow axis of said first viewing angle compensator is disposed perpendicular to an absorption axis of said first polarizer;

the in-plane slow axis of said first viewing angle compensator is disposed perpendicular to an in-plane slow axis of said second viewing angle compensator; and a retardation in an in-plane direction of said first viewing angle compensator is larger than a retardation in an in-plane direction of said second viewing angle compensator.

8. The liquid crystal display according to claim 7, wherein:

a retardation in a thickness direction of said first viewing angle compensator is a half of, or larger than, a retardation in the in-plane direction of said first viewing angle compensator and 300 nm or smaller; and a retardation in the thickness direction of said second viewing angle compensator is a half of, or larger than a retardation in the in-plane direction of said second viewing angle compensator and 300 nm or smaller.

9. The liquid crystal display according to claim 7, wherein:

said first and second viewing angle compensators are both an A plate or said first viewing angle compensator is an A plate and said second viewing angle compensator is a viewing angle compensator having negative biaxial optical anisotropy;

a retardation in the in-plane direction of said first viewing angle compensator is 100 nm or larger and 300 nm or smaller; and a retardation in the in-plane direction of said second viewing angle compensator is larger than 0 and 150 nm or smaller.

10. The liquid crystal display according to claim 9, wherein Re2 and Rth2 satisfy a relation of $4500/Rth2-10$ nm$\leq$Re2$\leq$4500/Rth2+10 nm, where Re2 is a retardation in the in-plane direction of said second viewing angle compensator, and Rth is a retardation in the thickness direction.

11. The liquid crystal display according to claim 9, wherein a retardation in the in-plane direction of said first viewing angle compensator is 100 nm or larger and 150 nm or smaller, or 250 nm or larger and 300 nm or smaller.

12. The liquid crystal display according to claim 7, wherein:

said first viewing angle compensator is a viewing angle compensator having negative biaxial optical anisotropy, and said second viewing angle compensator is an A plate;

a retardation in the in-plane direction of said first viewing angle compensator is 140 nm or smaller; and a retardation in the in-plane direction of said second viewing angle compensator is 100 nm or smaller.

13. The liquid crystal display according to claim 12, wherein:

a retardation in the in-plane direction of said first viewing angle compensator is 100 nm or larger and 140 nm or smaller; and a retardation in the in-plane direction of said second viewing angle compensator is 70 nm or smaller.

14. The liquid crystal display according to claim 7, wherein a retardation of said liquid crystal layer is 300 nm or larger and 450 nm or smaller.

15. The liquid crystal display according to claim 7, further comprising at least one negative C plate disposed between said first transparent substrate and said second viewing angle compensator.

* * * * *